United States Patent [19]
Laplante

[11] Patent Number: 5,620,232
[45] Date of Patent: Apr. 15, 1997

[54] MECHANISM TO CONVERT ANGULAR RECIPROCAL MOVEMENTS INTO INTERMITTENT UNIDIRECTIONAL ROTARY MOVEMENT

[76] Inventor: Alvin A. Laplante, Boite 3607, Station: Bureau Chef, Tracadie, N. B., Canada, E1X 1G5

[21] Appl. No.: 506,009

[22] Filed: Jul. 24, 1995

[51] Int. Cl.$^6$ ................................................. A47D 13/10
[52] U.S. Cl. ..................... 297/282; 297/463.2; 74/126; 192/48.92
[58] Field of Search ............... 297/463.2, 258.1, 297/259.3, 260.1, 261.4, 263.1, 270.1, 273, 282; 74/126; 188/82, 84; 192/45, 48.92

[56] References Cited

U.S. PATENT DOCUMENTS

| | | |
|---|---|---|
| 2,660,893 | 3/1953 | Paterson . |
| 3,235,304 | 2/1966 | Glass ........................................ 297/282 |
| 3,342,526 | 9/1967 | Sereda ................................... 297/258.1 |
| 4,213,650 | 7/1980 | Sroub . |
| 4,877,290 | 10/1989 | Schetl ................................... 297/270.1 |
| 5,280,996 | 1/1994 | Trent . |
| 5,460,427 | 10/1995 | Serber ....................................... 297/282 |

Primary Examiner—Milton Nelson, Jr.
Assistant Examiner—Anthony D. Barfield
Attorney, Agent, or Firm—Mario D. Theriault

[57] ABSTRACT

There is provided in combination a first member and a second member movable in a reciprocal angular movement, and an articulation between the first member and the second member. The articulation comprises a shaft and a mechanism to convert the angular reciprocal movements of both members into an intermittent unidirectional rotary movement of the shaft, The mechanism of the articulation comprises a pair of ball bearings having each an outer race mounted in a fixed relationship with a respective first or second member, and also having each an inner race mounted in a fixed and coaxial relationship with the shaft. The mechanism further has a pair of flanges, being each mounted adjacent and coaxially a respective bearing, and also in a fixed relationship with a respective first or second member. Each flange has one-way clutch acting on the shaft in a first direction, whereby a movement of either the first member or the second member in the first direction causes the flange fixed to that first member or to that second member to clutch onto the shaft and to rotate the shaft in that first direction. Conversely, a movement of either first or second member in a second direction causes the flange fixed to that first member or to that second member to slide on the shaft, preventing thereby a movement of the shaft in the second direction. Thus during movement of the members, the inner races of the bearings of the articulation are rotated intermittently in the first direction.

1 Claim, 6 Drawing Sheets

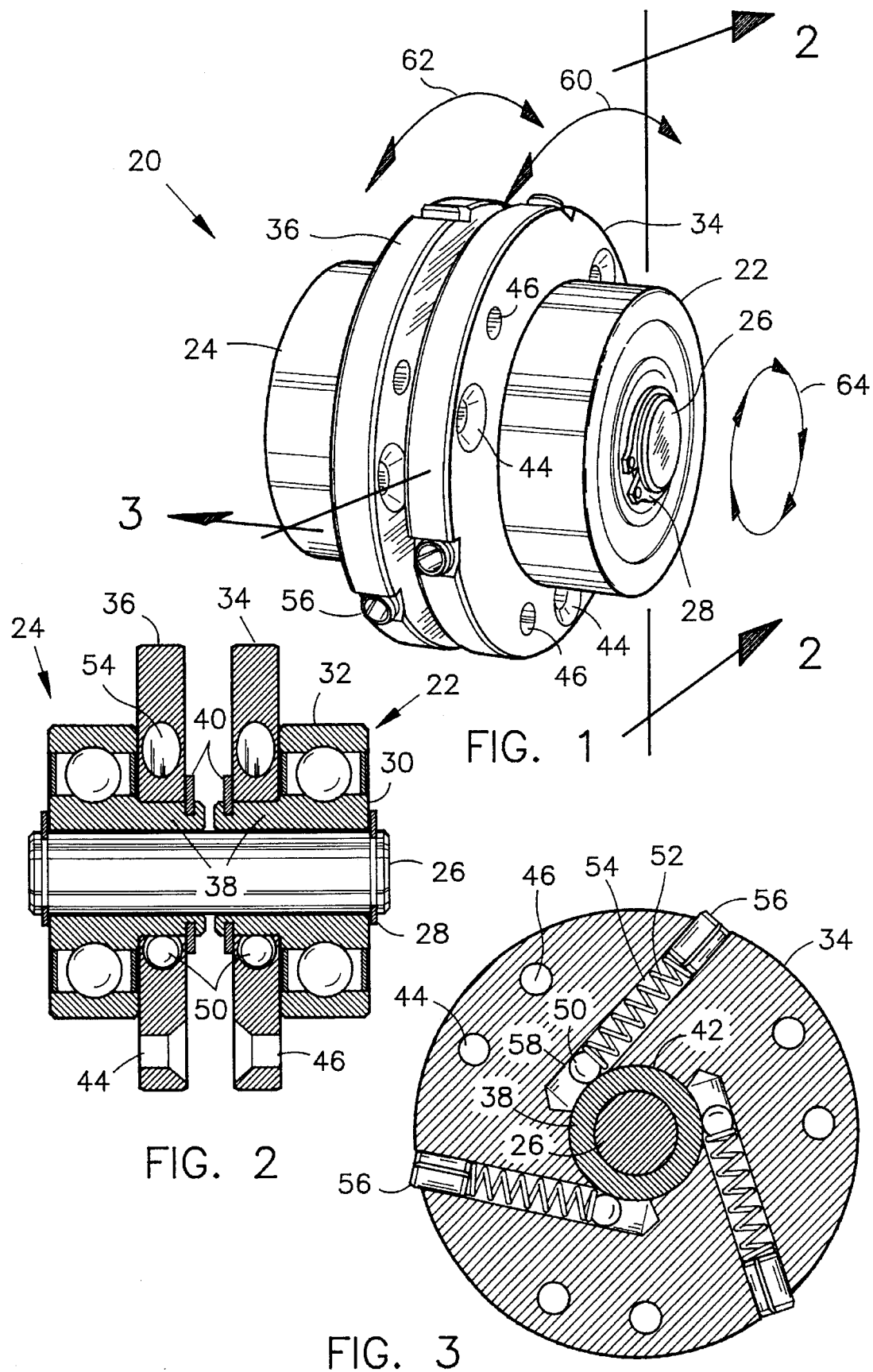

MECHANISM TO CONVERT ANGULAR RECIPROCAL MOVEMENTS INTO INTERMITTENT UNIDIRECTIONAL ROTARY MOVEMENT

FIELD OF THE INVENTION

The present invention relates to a mechanism to convert angular reciprocal movements of two articulated members into intermittent unidirectional rotary movement, in particular to rotate the inner race of a bearing at the articulation of both members.

BACKGROUND OF THE INVENTION

In machine elements having ball bearing articulations, where the bearing races do not move through a full rotation, it is a common occurrence that these bearings fail prematurely. A typical cause for these failures is a lack of lubrication, inducing excessive wear on the bearing parts.

In a bearing which is limited to an angular reciprocal movement, whether the bearing is greased for life and sealed, or grease packed manually upon installation, the lubricant is gradually displaced towards the low pressure region therein, such that the balls under pressure are deprived of lubrication. This condition results in an accumulation of abrasive substances, like metal particles from wear of the parts, in the high pressure region of the bearing races. It is a common occurrence also that the unlubricated portion of the bearing starts to rust, adding to the deterioration of the high pressure region.

The ensuing friction generates more abrasive particles from metal grinding, and heavier loading of the bearing due to obstructed movements of the balls. At this stage, the bearing generally deteriorates at an accelerated pace.

As a first example of an application where the bearings have a limited rotation, the support members of a gliding-style rocking chair swing back and forth in an angular movement. The bearings of those articulations also rotate back and forth in an angular movement, without moving around a full turn. The lubricant in those bearings is not circulated around the bearing races. Hence accelerated wear occurs, causing a premature squealing and cracking of the chair.

Similarly, articulated jib booms of industrial manipulators have pivots which are limited to an angular movement. The weight of the load being carried by the boom is always applied on the same balls of the bearings, and in the same region of the bearing races. Hence accelerated wear of these bearings results in a shaky motion of the boom caused by flat spots on some balls or rough regions in the bearing races.

In a further application and for similar reasons, the ball bearing articulations of a robotic arm must be maintained frequently in order to prevent wear of the bearings and a following loss of precision in that machine's movements.

With respect to this common problem with ball bearings, the inventor of the present invention is unaware of any device in the prior art to prolong the life of a ball bearing moving in a back and forth angular movement.

SUMMARY OF THE INVENTION

In the present invention however, there is provided in combination a first member movable in a first reciprocal angular movement having a first direction and a second direction, a second member movable in a second reciprocal angular movement, the first reciprocal angular movement and the second reciprocal angular movement being parallel and directionally opposite, and an articulation between the first member and the second member.

The articulation between the first and the second member comprises a shaft and a mechanism to convert the first and second angular reciprocal movements of the first and second members into an intermittent unidirectional rotary movement of the shaft.

The mechanism of the articulation comprises a pair of ball bearings having each an outer race mounted in a fixed relationship with a respective first or second member, and also having each an inner race mounted in a fixed and coaxial relationship with the shaft. The mechanism further has a pair of flanges, being each mounted adjacent and coaxially a respective bearing, and also in a fixed relationship with a respective first or second member.

Each flange has one-way clutch means acting on the shaft in the first direction, whereby a movement of either the first member or the second member in a first direction causes the flange fixed to that first member or to that second member moving in the first direction to clutch onto the shaft and to rotate the shaft in that first direction.

Conversely, a movement of either first member or second member in a second direction causes the flange fixed to that first member or to that second member moving in a second direction to slide on the shaft, preventing thereby a movement of the shaft in that second direction.

A first advantage of this embodiment is that the inner race of both bearings are intermittently rotated entire turns. The lubricant within these bearings is circulated within the entire space of the bearings, to flush abrasive particles away from the bearing races, and to lubricate the pressure regions of the bearings.

A second advantage of the mechanism of the present invention is that the inner races and the balls of the bearings of the articulation are circulated around the bearings, equalizing thereby the wear of these parts.

In accordance to another aspect of the present invention, there is provided a bearing assembly for installation in a mechanism to convert reciprocal angular movements into an intermittent unidirectional rotary movement. The bearing assembly comprises a bearing having an inner race wider than an outer race, and a flange rotatively mounted on the extended portion of the inner race.

The flange of the bearing assembly has one-way clutch means therein, acting on the extended portion of the inner race in a first direction relative to a plane of rotation of the bearing, whereby a movement of the flange in the first direction, causes the flange to clutch onto the inner race to rotate the inner race in the first direction. A movement of the flange in a second direction opposite the first direction, causes the flange to slide on the inner race, preventing thereby a movement of the inner race in the second direction.

Hence, an advantage of this other aspect of the present invention, is that the flange may be mounted on the inner race of the bearing as a pre-assembled unit for easy mounting of the bearing assembly onto machine elements.

In accordance to a further aspect of the present invention, there is provided a glider-style rocking chair having a first support member movable in a first reciprocal angular movement having a first direction and a second direction, a second support member movable in a second reciprocal angular movement, the first reciprocal angular movement and the second reciprocal angular movement being parallel, directionally opposite, and set by a rocking motion of the rocking chair.

The novel glider-style rocking chair also has an articulation between the first support member and the second support member. The articulation comprises a shaft and a mechanism to convert the first and the second angular reciprocal movements of the first and second support members into an intermittent unidirectional rotary movement of the shaft.

The mechanism of the articulation has a pair of ball bearings having each art outer race mounted in a fixed relationship with a respective first or second support member, and having each an inner race mounted in a fixed and coaxial relationship with the shaft. The mechanism further comprises a pair of flanges being each mounted adjacent and coaxially a respective bearing, and also in a fixed relationship with a respective first or second support member.

Each of the flanges has one-way clutch means acting on the shaft in the first direction, whereby a movement of either first or second support member in the first direction causes the flange fixed to that first or to that second member moving in the first direction to clutch onto the shaft and to rotate the shaft in that first direction. The movement of either first or second support member in a second direction causes the flange fixed to that first or second support member moving in the second direction to slide on the shaft, preventing thereby a movement of the shaft in that second direction.

An advantage of this further aspect of the present invention is that the lubricant in the bearings of that chair is circulated from the rocking motion of the chair. Therefore, the smooth and creaking free movement of this chair lasts much longer than other chairs equipped with conventional bearings.

BRIEF DESCRIPTION OF THE DRAWINGS

The preferred embodiments of the invention will be further understood from the following description, with reference to the drawings in which:

FIG. 1 is a perspective view of a mechanism of the present invention, comprising a pair of bearings mounted on a common shaft and having each a flange with clutch means therein. The figure illustrates the unidirectional movement of the shaft following reciprocal angular movements of the flanges.

FIG. 2 is a cross-section of the mechanism along line 2—2 of FIG. 1.

FIG. 3 is a cross-section of a flange along line 3 of FIG. 1, illustrating the preferred clutch means of the preferred embodiment.

DETAILED DESCRIPTION OF THE PREFERRED EMBODIMENT

Figure 4:
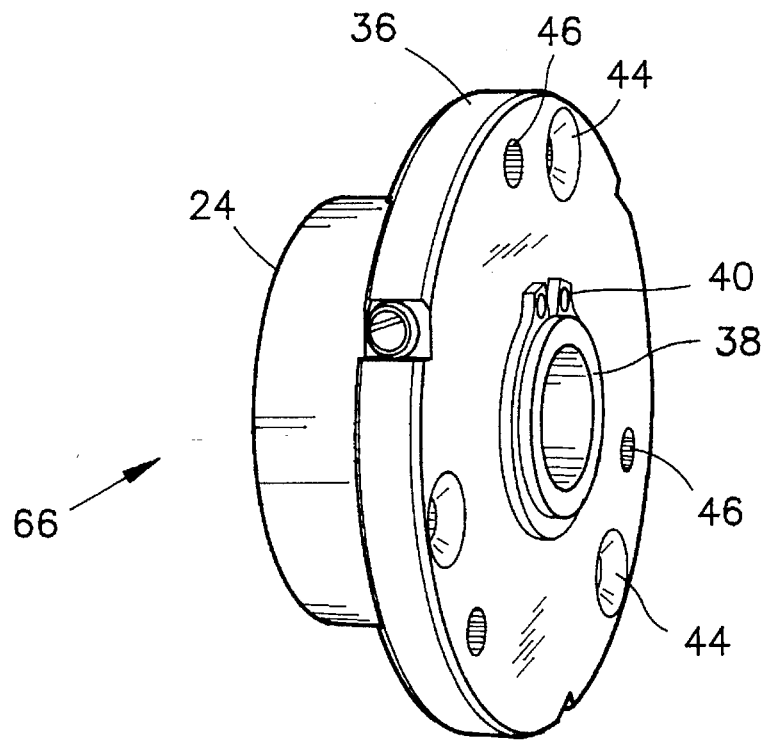
FIG. 4 is a perspective view of a preferred embodiment of a bearing assembly having an extended inner race and a flange mounted thereon.

Referring to FIG. 1, 2 and 3, there is illustrated a mechanism 20 of the preferred embodiment comprising a first bearing 22 and a second bearing 24 mounted on a common shaft 26. The bearings 22 and 24 are retained on shaft 26 by means of a groove and a snap ring 28 at each end of shaft 26. The bearings 22 and 24 are identical. Each bearing 22 or 24 has an inner race 30 which is wider the outer race 32.

Adjacent bearings 22 and 24, there is provided a first flange 34 and a second flange 36 mounted on the extended portion 38 of the inner race 30 of a respective bearing. Each extended inner race 38 is also grooved to retain flange 34 or 36 by means of another snap ring 40. Each flange 34 or 36 has a central opening 42 which is dimensioned with a loose running fit (RC 8) or (RC 9) over the extended inner race 38, so that the flange 34 or 36 can rotate freely on inner race 38. A loose running fit (RC 8) or (RC 9) is defined by the American National Standards Institute, Standard no. B4.1-1967, R1974, entitled Standard Limits and Fits.

Flanges 34 and 36 are identical. Each flange 34 or 36 has a first series of mounting holes 44 drilled perpendicular to a plane of the flange, and shaped to receive countersunk head screws from a first side of the flange 34 or 36. The flange 34 or 36 also has a second series of holes 46 with the countersunk form facing a second side of the flange. The countersunk shape of holes 46 is illustrated on the lower portion of FIG. 2. The two sets of holes 44 and 46 allow for the mounting of the flange 34 and 36 to an articulated member adjacent a first side or a second side thereof.

The flange 34 or 36 comprises one-way clutch means in the form of a steel ball 50 and a spring 52 enclosed in a cylindrical hole 54. The cylindrical hole 54 has a diameter allowing free guided movement therein of the ball 50 and spring 52. A preferred diameter of the cylindrical hole 54 in reference to the diameter of the ball 50 is a loose running fit (RC 9) as defined earlier.

The hole 54 starts from the perimeter of the flange 34, and extends in a parallel relationship with a plane of flange 34. Cylindrical hole 54 is oriented substantially tangentially to the central opening 42, with a segment thereof intersecting with the central opening 42.

The width of this intersection, or the maximum length of a chord of the intersecting segment of the cylindrical hole 54, as it will be explained later is less the one diameter of the ball 50, such that the ball 50 remains inside the cylindrical hole 54 at all times.

The cylindrical hole 54 further extends the distance of at least one diameter of the ball 50 beyond a perpendicular between the central opening 42, and the longitudinal axis of cylindrical hole 54.

The spring 52 is held inside cylindrical opening 54 by means of a spring pin 56 in the opening of the cylindrical hole 54. The advantage of the spring pin 56 for closing cylindrical hole 54, is that it is easier to assemble in production and to remove for maintenance than other means such as a cap screw for example.

The diameter of the ball 50 is slightly larger than the inside diameter of the spring 52, such that the ball 50 is urged towards the bottom of cylindrical hole 54 by the spring 52.

Referring now specifically to FIG. 3, the flange 34 preferably has three equally spaced cylindrical holes 54, having each a ball 50, a spring 52 and a spring pin 56.

In the mechanism 20 of the present invention, the clutch means of both flange 34 and 36 are oriented in the same direction. During the assembly of the mechanism 20 into articulated members, bearings 22 and 24 are intended to be mounted such that the outer race 32 of each bearing is stationary in relation to a respective articulated member, and in relation to a respective flange 34 or 38. Furthermore, the inner race 38 of both bearings 22 and 24 are rigidly mounted on shaft 26, such that a rotational displacement of either inner races 38 on the shaft 26 is minimal.

Considering the mechanism 20 of the present invention, when the flange 34 is rotated in a counter-clockwise direction, while the flange 36 is held stationary, the friction applied on the ball 50 of flange 34 by the inner race 38 of bearing 22, causes the ball 50 to compress the spring 52, and to move inside the cylindrical hole 54 in a direction towards the perimeter of flange 34. The action of ball 50 and the compression of the spring 54 allows rotation of the flange 34 in a counterclockwise direction. Concurrently, the friction applied onto the inner race 38 of the first bearing 22 is transmitted through the shaft 26 to the inner race 38 of the second bearing 24, forcing the shaft 26 and the inner race 38 of the second bearing 22 towards a counterclockwise rotation. Since flange 36 is held stationary, the friction of the inner race 38 of the second bearing 24 on the balls 50 of the flange 36 causes the balls 50 to wedge against the inner race 38 and the inside wall 58 of the cylindrical hole 54 of the flange 36, to prevent a rotation of the shaft 26 and both inner races 38 in a counterclockwise direction. Thus both inner races 38 are held fixed during a counterclockwise rotation of flange 34.

If however a torque is applied on flange 34 in a clockwise direction, the friction applied on the ball 50 together with the pressure of spring 52 causes the ball 50 to move towards the bottom the cylindrical hole 54 of the flange 34. A slight movement of the ball 50 in this direction causes it to wedge against the inner race 38 and the inside wall 58 of the cylindrical hole 54, inducing thereby a rotation of the inner race 38 and shaft 26 in the same clockwise direction as flange 34. Therefore, both inner races 38 are driven in a clockwise direction when flange 34 rotates in a clockwise movement.

The same analysis applies to the first hypothesis expressed above whether flange 36 is held stationary or moving in a clockwise direction, In both cases the inner races 38 are held stationary in relation to flange 36.

Moreover, when a torque 18 applied onto flange 36 in the counterclockwise direction, the slipping action of balls 50 of flange 36, as explained in the foregoing allows the flange 36 to rotate freely in a counterclockwise direction despite the shaft 26 and both inner races 38 being urged in a clockwise direction by flange 34.

Therefore, by repeating this to and fro movement of flanges 34 and 36, the shaft 26 and inner races 38 of both bearings 22 and 24 are propelled in an intermittent unidirectional rotary motion in a clockwise direction.

In a broader sense, arrow 60 represents a reciprocal movement of the flange 34, while arrow 62 represents a reciprocal movement of the flange 36. Flange 34 an 36 are intended to reciprocate simultaneously in opposite directions.

When the flange 34 rotates in a clockwise direction, the balls 50 in this flange latch against the inner race 38 of bearing 22, causing this inner race to rotate clockwise as indicated by arrow 64. In the mean time, a counterclockwise rotation of the flange 36 causes the balls 50 of this flange to compress the spring 54, and allow free rotation of flange 36 in a counterclockwise direction. Similarly, when flange 36 rotates in a clockwise direction, it forces the inner race 38 of bearing 24 to rotate also in a clockwise direction, while flange 34 moves freely in a counterclockwise direction. Thus the inner race 38 of both bearing 22 and 24, and the shaft 26 are driven in an intermittent rotary movement in the clockwise direction as shown by arrows 64. The inner race 38 of both bearings 22 and 24 are thereby eventually rotated entire turns, whereby the lubricant within each bearing is circulated therein.

Figure 5:
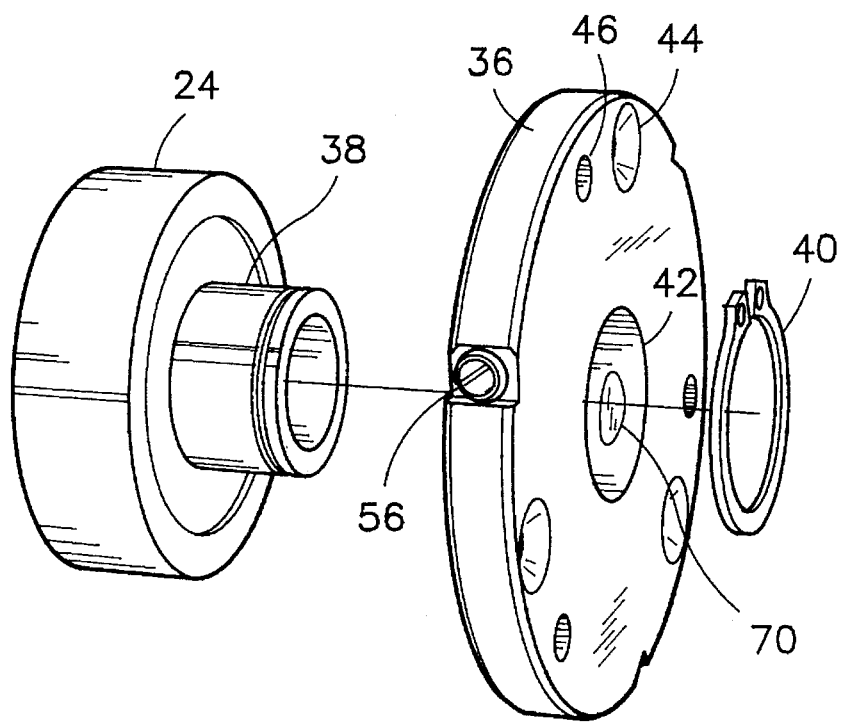
FIG. 5 is an exploded view of the bearing and flange assembly of FIG. 4.

Referring now to FIGS. 4 and 5, there is illustrated a preferred embodiment of a bearing assembly 66, having an extended inner race 38, and a flange 36 mounted thereon. The inner race 38 is grooved to retain flange 36 by means of a snap ring 40. The intersection 70 of the cylindrical hole 54, as seen earlier on FIG. 3, and the circular opening 42 of flange 36 is better illustrated on FIG. 5. The width of the intersection 70 is smaller than the diameter of the ball 50 such that the ball 50 remains inside the cylindrical hole 54 when the flange 36 is taken apart the inner race 38. A preferred dimension for this intersection is that a maximum chord length of the intersecting segment of the cylindrical hole 54 should be between 0.65 to 0.95 of the ball diameter.

The advantage of this mounting with a groove and a snap ring 40 is that flange 36 may easily be taken apart from the bearing 24, and inverted on the inner race 38 according to a preferred orientation of the clutch means therein, Along the character of this feature, the flange 36 may be attached to a mounting member with screws in either countersunk holes 44 facing towards a first side, or through countersunk holes 46 facing towards the other side of the flange 36.

Another advantage of mounting the flange 36 over the extended inner race 38 of a bearing 24 is that the bearing 24 and flange 36 may be pre-assembled and sold as one unit for easy installation by manufacturers into articulated members.

Figure 6:
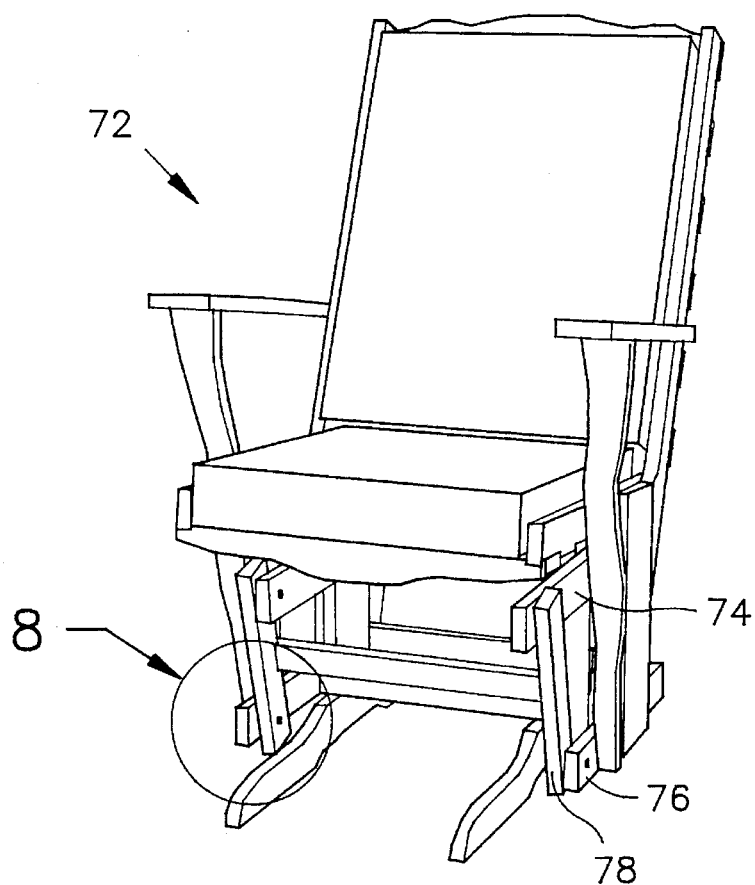
FIG. 6 perspective view of a glider-style rocking chair illustrating a typical application for the mechanism of the present invention.
Figure 7:
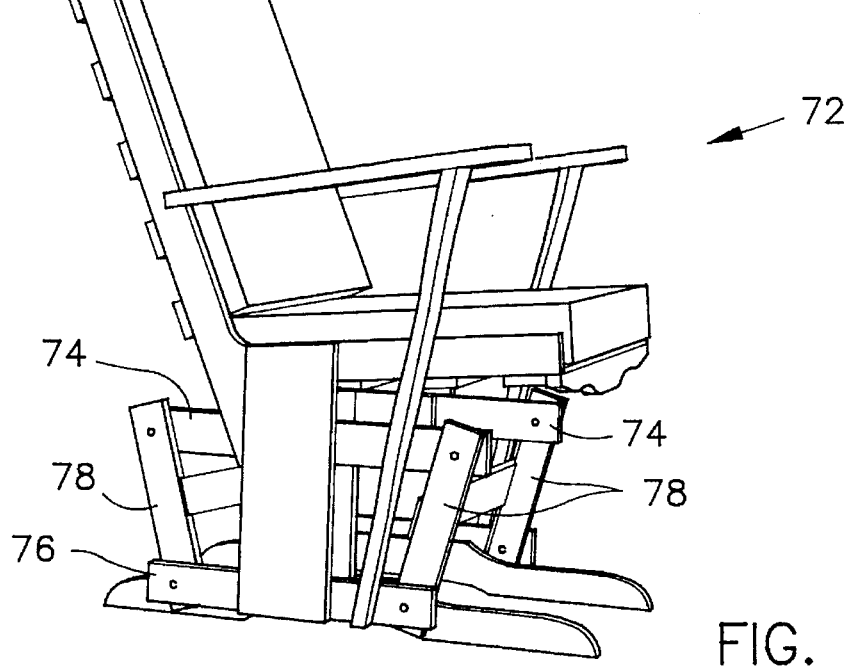
FIG. 7 is another view of the rocking chair of FIG. 6 showing the articulations of the support members of the chair.
Figure 8:
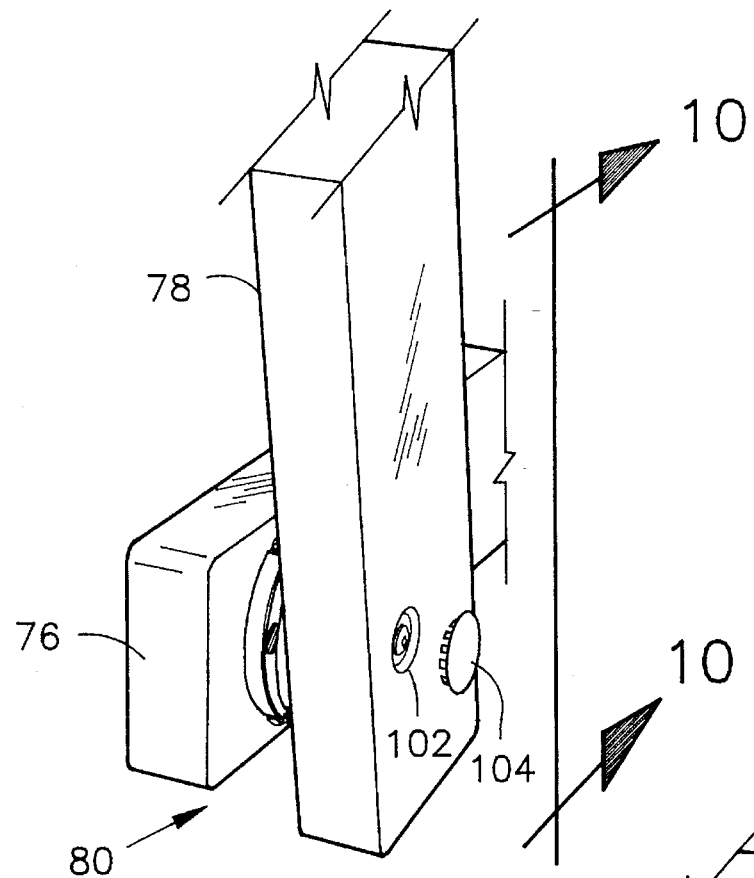
FIG. 8 is a close-up view of an articulation of the rocking chair of FIG. 6, which is shown as detail 8 on FIG. 6.
Figure 9:
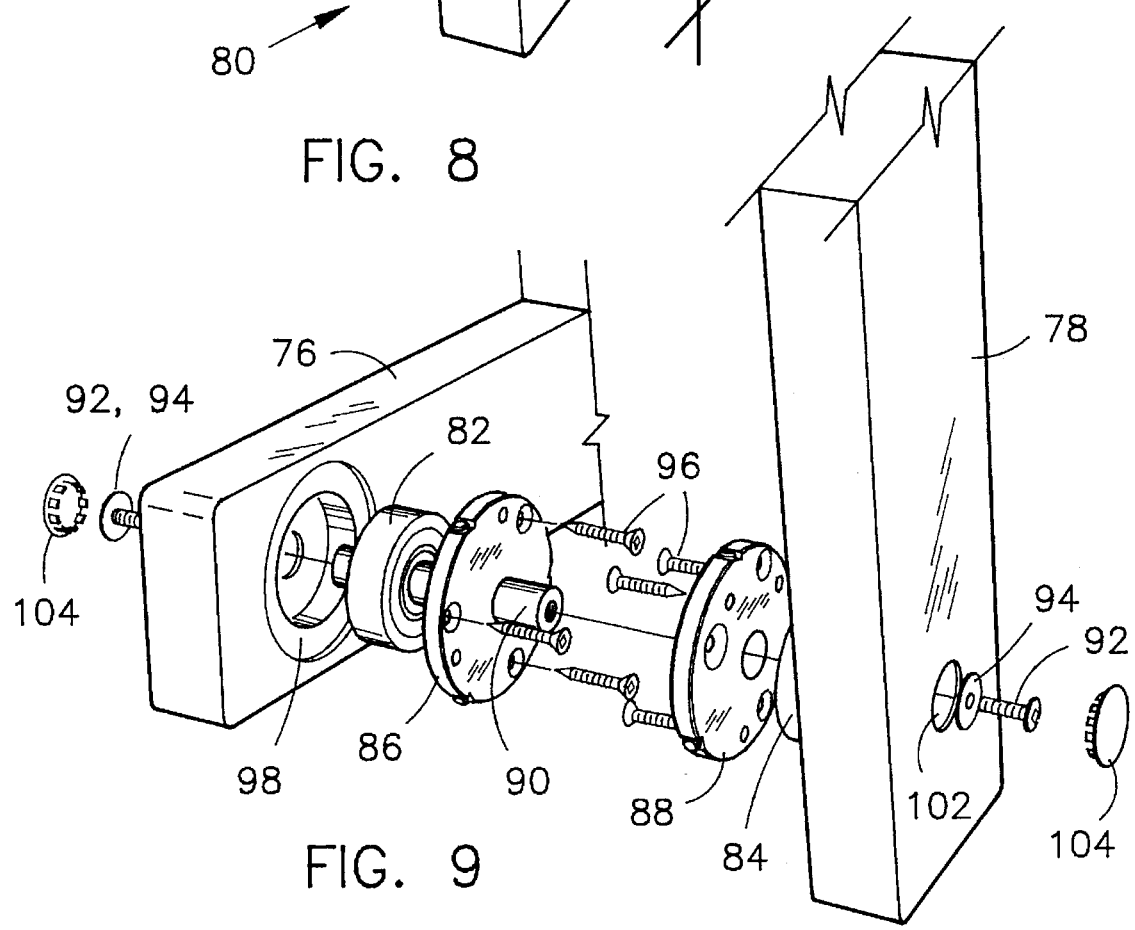
FIG. 9 is an exploded view of the articulation of FIG. 8.
Figure 10:
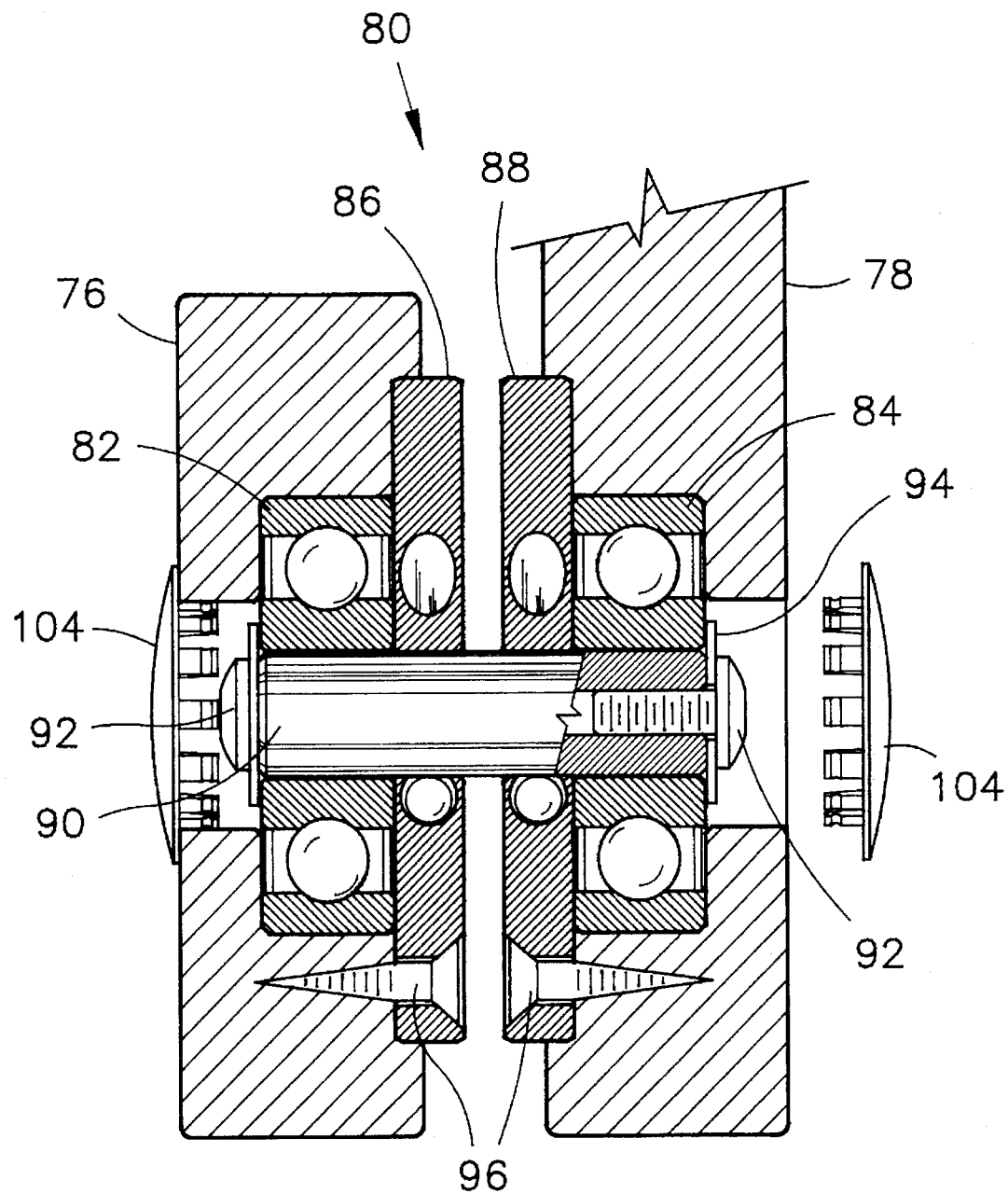
FIG. 10 is a cross section of the articulation of the rocking chair of FIG. 6, along line 10—10 of FIG. 8.

The glider-style rocking chair 72 of FIGS. 6 and 7, is supported by upper members 74, lower members 76 and four link members 78 having each an upper articulation with the upper member 74 and a second articulation with the lower member 76. Each of these articulations has a second preferred embodiment of the present invention. This second preferred embodiment of the mechanism of the present invention is better illustrated on FIG. 8, 9 and 10.

The mechanism 80 of the second preferred embodiment comprises a first bearing 82 mounted in the support member 76, a second bearing 84 mounted in the link member 78, a first flange 86 mounted adjacent the first bearing 82, and a second flange 88 mounted adjacent the second bearing 84. Both bearings 82 and 84, and both flanges 86 and 88 are mounted on a common shaft 90.

The shaft 90 is drilled and tapped axially in both ends to receive a screw 92. A screw 92 in association with a washer 94 having a diameter larger than the diameter of the shaft 90, in both ends of the shaft 90, retain both bearings 82 and 84 on the shaft 90 against a separation of the mechanism 80.

The flanges 86 and 88 of the preferred embodiment are attached to members 76 and 78 respectively, by means of screws 96 through the respective flanges 86 and 88. The screws 96 prevent a separation of the mounting members 76 and 78 from the mechanism 80, providing thereby a rigid articulation for the rocking chair 72.

The assembling of the mechanism 80 in a support member of a chair requires a machined cavity 98 to receive the bearing 82 or 84, or to receive both the bearing 82 or 84 with the respective flange 86 or 88. The machined cavity 98 must also comprise a through hole 102 to allow the installation of screw 92 and washer 94. This hole 102 may optionally be covered after the installation of the mechanism 80, with a dust cap 104.

In this second preferred embodiment, bearings 82 and 84 are of the plain type, that is without an extended inner race. Therefore, flanges 86 and 88 are dimensioned to rotate freely on the shaft 90 of the mechanism 80.

In this illustrated application, the rocking motion of the chair induces a reciprocal and opposite angular movement to both the support member 76 and the link member 78, causing flanges 86 and 88 to alternatively force the shaft 90 into an unidirectional and intermittent rotary motion. With both bearings 82 and 84 being mounted rigidly onto the shaft 90, the inner races of both bearings 82 and 84 are forced into complete rotation, ensuring thereby a constant lubrication of the bearings, and a distributed wear of the bearing races and balls.

While the preferred embodiments of the invention as described herein are mainly for glider-style rocking chairs, and for general uses where an extended inner race on the bearing is advantageous, other applications are possible without altering the structure of the invention. For examples, and without limiting the applicability of the present invention to industrial machine elements, articulations of the type shown on FIGS. 11 and 12 are evident potential uses of the mechanism of the present invention.

Figure 11:
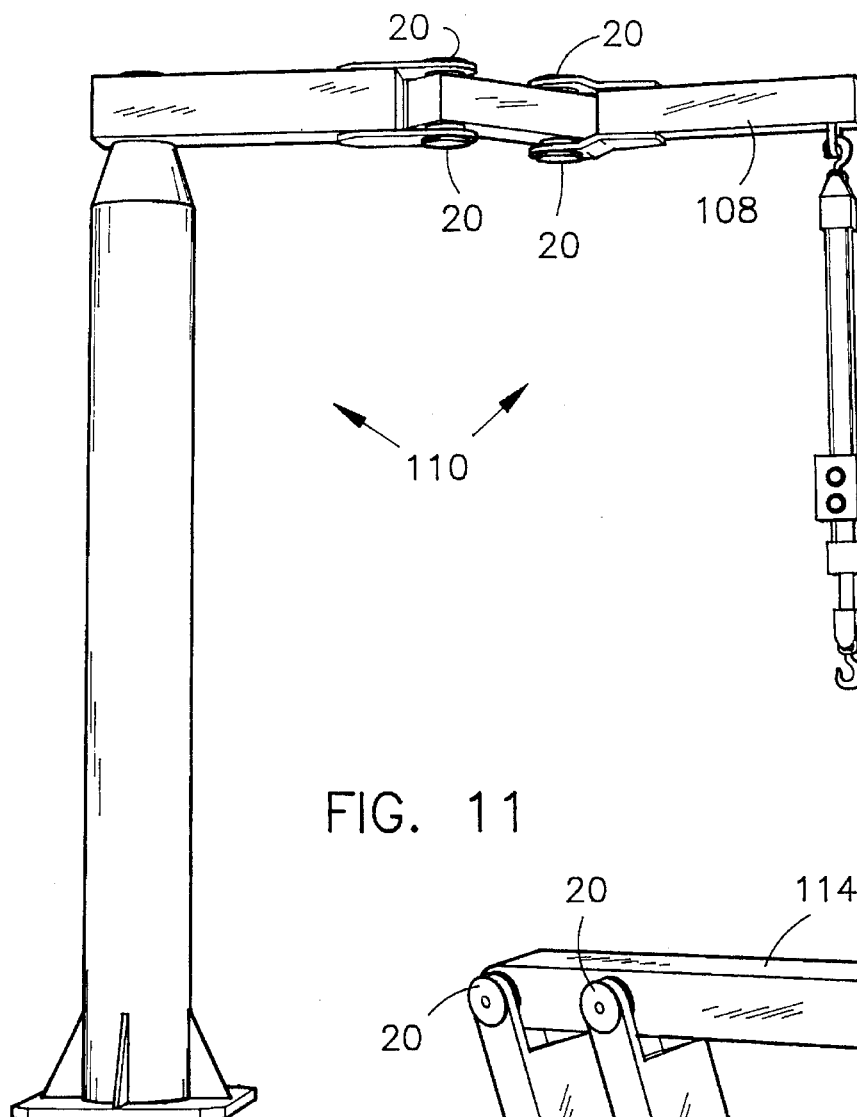
FIG. 11 is a side view of an industrial manipulator having an articulated jib boom. The figure illustrates a suggested application for the mechanism of the present invention.
Figure 12:
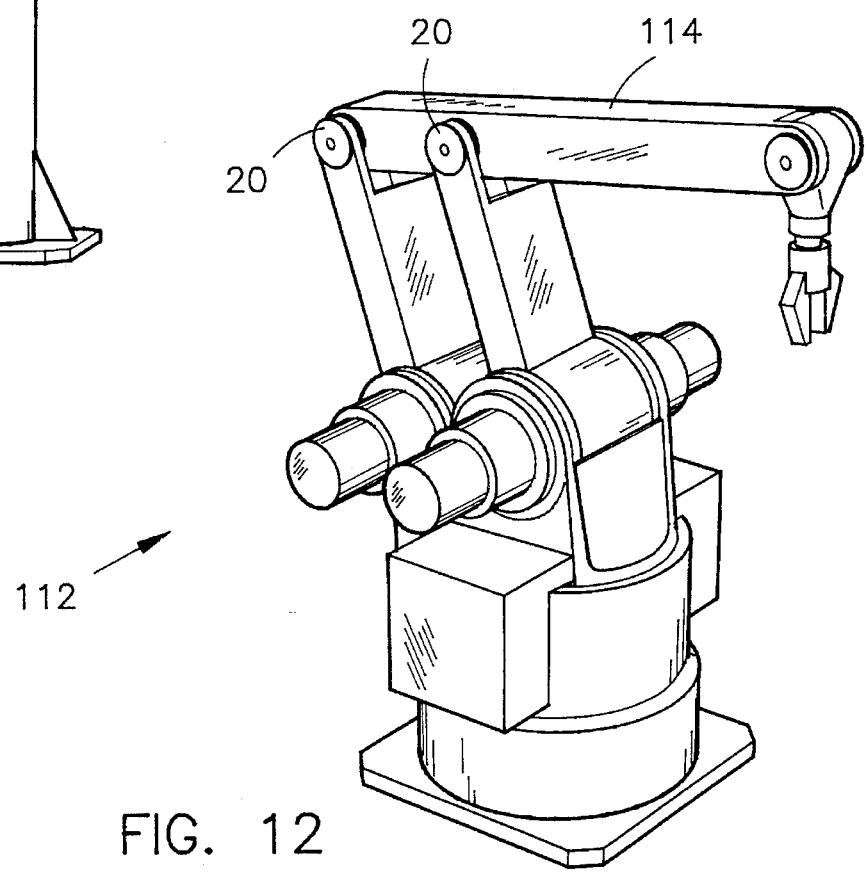
FIG. 12 is a robotic arm having articulations which may also use the mechanism of the present invention.

In FIG. 11, the articulations of the jib boom 108 of an industrial manipulator 110 may be fitted with mechanisms of the present invention. The mechanisms 20 of the present invention would provide a smoother movement of the boom over a longer period, than would give conventional bearings having a movement limited to an angular displacement. As another example of an industrial application for the mechanism 20 of the present invention, is an industrial robotic machine 112 such as the one shown in FIG. 12. The upper arm 114 of the machine 112 may be adapted with mechanisms 20 of the present invention to maintain the precision of the machine over a longer period than with conventional bearings having the movement restrictions as described earlier.

Therefore, the preferred embodiments of the invention as described herein are not limited thereto, and it will be apparent to those skilled in the art that numerous modifications form part of the present invention insofar as they do not depart from the spirit, nature and scope of the described and claimed invention.

I claim:

1. A glider-style rocking chair having;

a first support member movable in a first reciprocal angular movement having a first direction and a second direction, a second support member movable in a second reciprocal angular movement, said first reciprocal angular movement and said second reciprocal angular movement being parallel, directionally opposite, and set by a rocking motion of said rocking chair, and an articulation between said first support member and said second support member, said articulation comprising a shaft and a mechanism to convert said first and said second angular reciprocal movements of said first support member and said second support member into an intermittent unidirectional rotary movement of said shaft, said mechanism comprising;

a pair of ball bearings having each an outer race mounted in a fixed relationship with a respective said first support member or said second support member, and having each an inner race mounted in a fixed and coaxial relationship with said shaft, a pair of flanges being each mounted adjacent and coaxial a respective said bearing and also in a fixed relationship with a respective said first support member or said second support member, each of said flanges having one-way clutch means acting on said shaft in said first direction, whereby a movement of either said first support member or said second support member in said first direction causes said flange fixed to said first support member or to said second support member moving in said first direction to clutch onto said shaft and to rotate said shaft in said first direction, and a movement of either said first support member or said second support member in a second direction causes said flange fixed to said first support member or to said second support member moving in said second direction to slide on said shaft, preventing thereby a movement of said shaft in said second direction.

* * * * *